United States Patent [19]

Meckler

[11] 4,250,675
[45] * Feb. 17, 1981

[54] METHOD FOR FORMING WIRING CHANNELS IN A CONCRETE FLOOR

[75] Inventor: Gershon Meckler, Bethesda, Md.

[73] Assignee: Gershon Meckler Associates, P.C., Washington, D.C.

[*] Notice: The portion of the term of this patent subsequent to Jun. 21, 1994, has been disclaimed.

[21] Appl. No.: 964,230

[22] Filed: Nov. 28, 1978

Related U.S. Application Data

[63] Continuation-in-part of Ser. No. 771,789, Feb. 24, 1977, abandoned, which is a continuation-in-part of Ser. No. 639,295, Dec. 10, 1975, Pat. No. 4,030,259.

[51] Int. Cl.³ .............................................. E04B 5/48
[52] U.S. Cl. ...................................... 52/221; 52/741; 264/34; 264/35
[58] Field of Search ................. 264/34, 35; 52/220, 52/221, 741, 745

[56] References Cited

U.S. PATENT DOCUMENTS 4,030,259  6/1977  Meckler ................................. 52/221

Primary Examiner—Thomas P. Pavelko

Attorney, Agent, or Firm—John C. Purdue

[57] ABSTRACT

An improved method for forming wiring channels in a prefabricated concrete floor slab is disclosed. At least one trench is formed in a concrete floor slab when the slab is poured. A metal cover placed over the trench can have a metal U-shaped channel attached thereto for dividing the trench into at least two and preferably three separate wire raceways with the center raceway completely shielded by the channel and cover*. Access boxes are selectively positioned over knockouts in the cover plate. Metal channels are positioned to extend perpendicular to the trenches for forming main distribution ducts. A concrete surface is then poured over the slab to extend flush with the tops of the access boxes and the main distribution ducts and a cover plate is attached to enclose the main distribution ducts. The resulting floor structure has embedded therein parallel wiring raceways spaced across the floor with spaced accesses into each raceway and main distribution ducts interconnecting the parallel raceways.

*Alternatively, at least two trenches are formed in a concrete floor slab when the slab is poured. A metal cover is placed over the two or more trenches to form at least two and preferably three separate wiring raceways each being defined by the walls of a trench and the cover plate.

14 Claims, 11 Drawing Figures

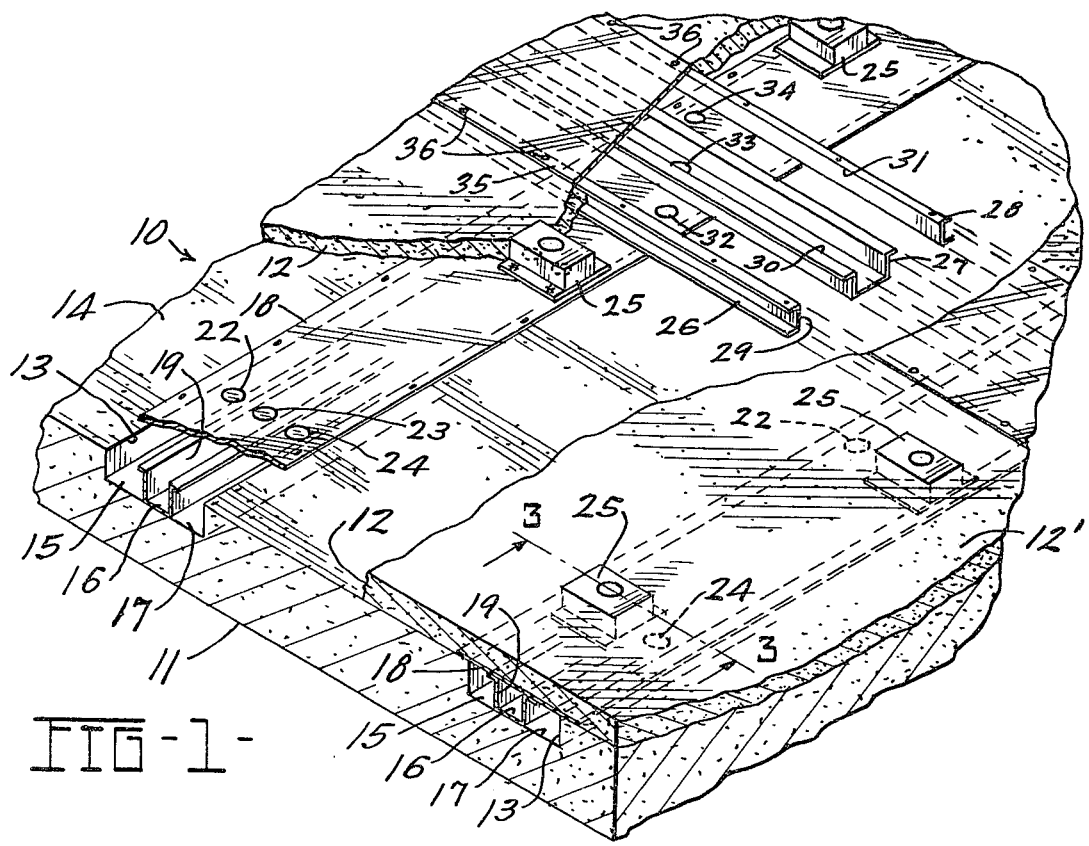
FIG-1-
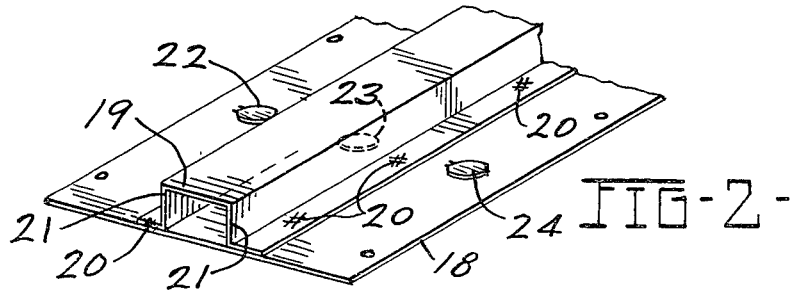
FIG-2-
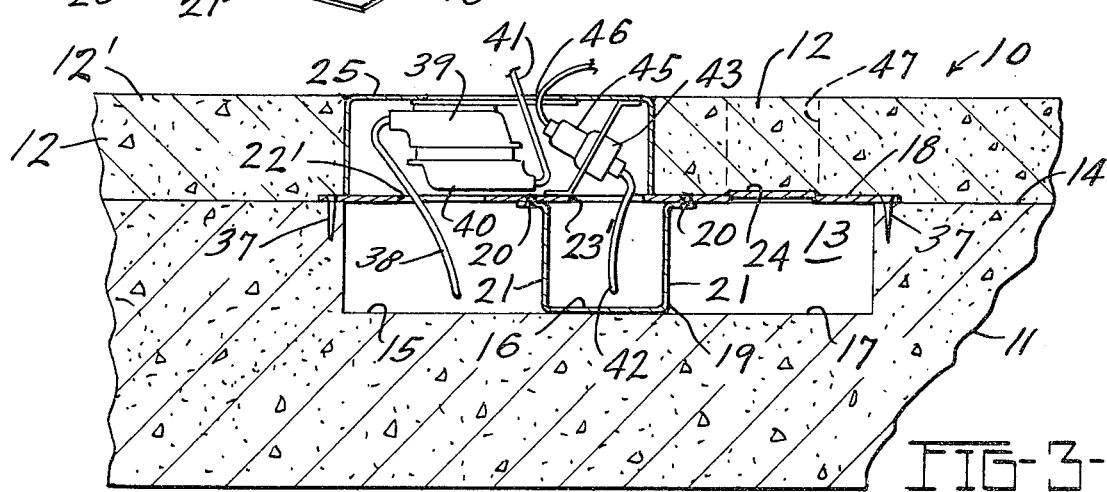
FIG-3-

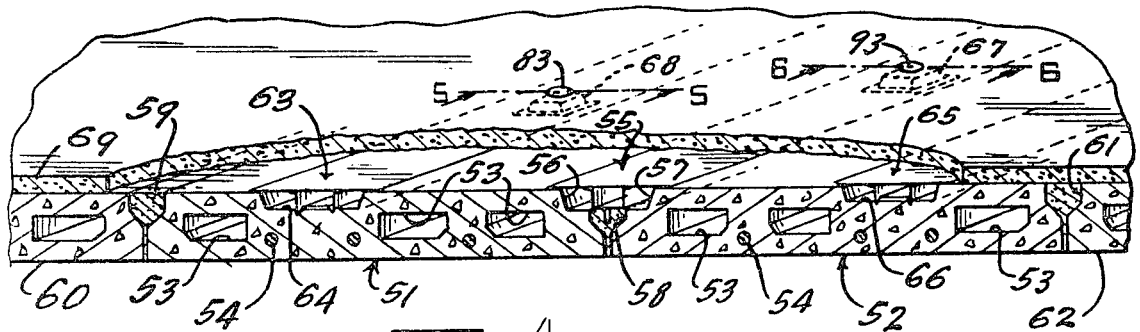
FIG-4-
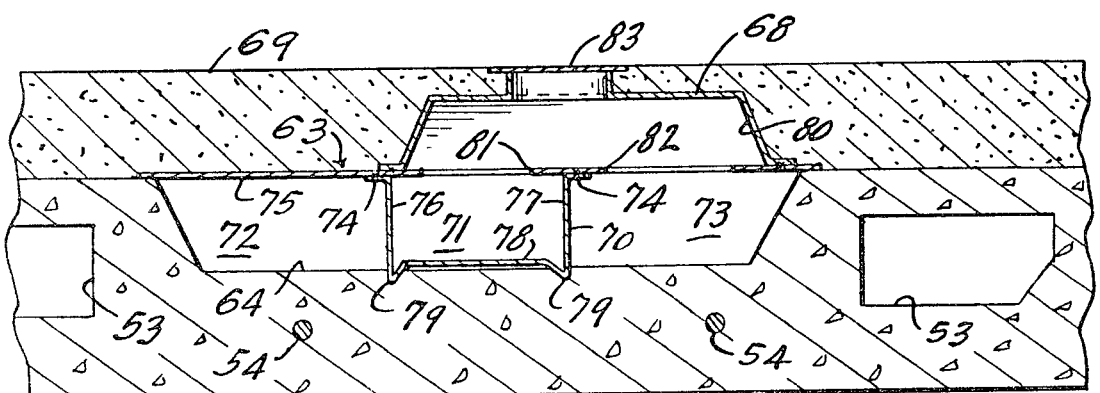
FIG-5-
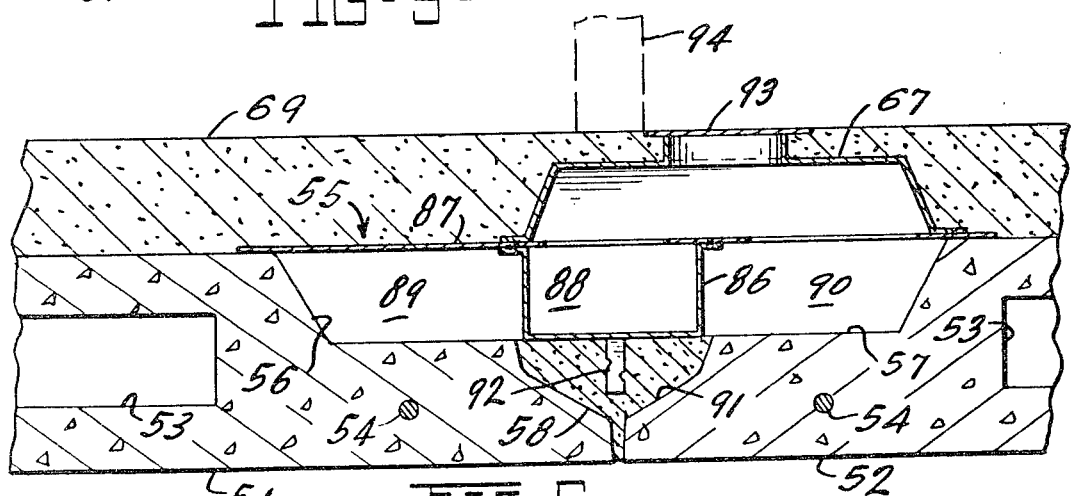
FIG-6-
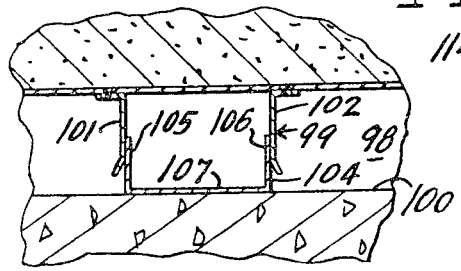
FIG-7-
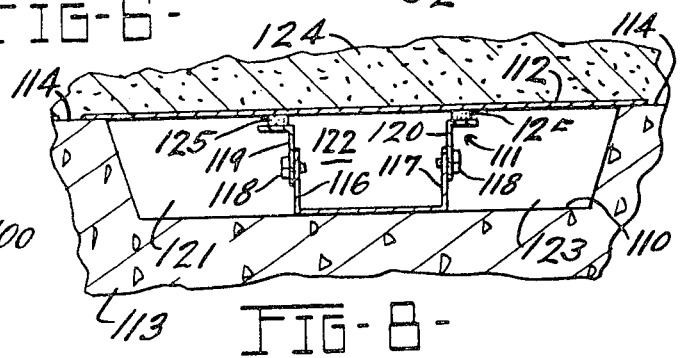
FIG-8-

METHOD FOR FORMING WIRING CHANNELS IN A CONCRETE FLOOR

CROSS REFERENCE TO RELATED APPLICATIONS

This is a continuation-in-part of my application Ser. No. 771,789, filed Feb. 24, 1977, now abandoned; as a continuation-in-part of my earlier application Ser. No. 639,295, filed Dec. 10, 1975, now U.S. Pat. No. 4,030,259, granted June 21, 1977.

BACKGROUND OF THE INVENTION

This invention relates to electrical wiring ducts for a building and more particularly to an improved method and structure for forming electrical wiring ducts in a concrete building floor.

Buildings formed from concrete are often partially constructed before a final floor plan is selected. After the basic building structure is erected, such buildings are subdivided into spaces such as individual offices. Utility ducts for wiring and comfort conditioning are sometimes formed in poured concrete floors to facilitate supplying required utilities to each space into which the building is subsequently divided. One prior art method for forming utility ducts in a poured concrete floor is shown in U.S. Pat. No. 3,0933,933 which issued Jan. 18, 1963 to Slingluff and in U.S. Pat. No. 2,975,559 which issued Mar. 21, 1961 to Hedgren. These patents disclose a building floor structure having a metallic cellular subflooring which forms parallel cells or conduits for carrying electrical cables and for air handling. Electrical ducts also are located immediately above and perpendicular to the cellular subflooring. These ducts are spaced across the subflooring to provide a desired spacing for electrical service connections. Access fittings are attached to the ducts at desired locations and the ducts are connected to the appropriate subfloor cells. A concrete floor is then poured over the cellular subflooring to embed the electrical ducts. Wiring for power and communications is passed through the subflooring cells and the desired ducts for serving the floor area wherever such service is needed. By running electrical power and communications wiring through different subfloor cells and through alternate ducts, the power wiring is shielded in accordance with some building codes and the communication wiring is isolated from the power wiring to minimize induced electrical noise. However, a building floor structure of this type is unnecessarily expensive because of the high cost for the cellular metallic subflooring and of the need for using separate metal channels for forming both power and communications ducts in the floor.

SUMMARY OF THE INVENTION

According to the present invention, an improved method is provided for forming wiring ducts or raceways in a prefabricated concrete floor slab. The method provides separate raceways for electrical power wiring and communications wiring; in a preferred structure the power raceways are completely shielded by metal.

In accordance with the present method, a prefabricated building floor slab is poured from concrete or a similar hardenable material. In some instances, parallel trenches are formed in the upper surface of, and spaced interiorly from the edges of the floor slab at the time of pouring. The slab is ultimately installed as a structural member of a building. At some point in time after the floor slab hardens sufficiently to maintain its shape, a metal cover plate is placed over each trench; the metal cover can be placed either before or after the slab is installed as a structural member on suitable building supports. In a preferred embodiment, a U-shaped metal channel is attached to the bottom of the cover plate to extend the length of the trench and for dividing the trench into at least two and preferably three separate raceways. Adjustment means can be provided in the sides of the U-shaped channel to compensate for irregularities in the depth of the trench. In other instances, a fraction of a trench extending along an upper edge of one slab and the remaining fraction of the trench extending along an upper edge of another slab form one complete trench when the two slabs are installed adjacent to each other as structural members of a building. Grouting is then poured into a joint formed between the slabs below the trench and, in the preferred embodiment, a cover plate having an attached U-shaped channel is then positioned on the trench. Preferably, anchors spaced along the bottom of the U-shaped channel are set within the grouted joint between the two slabs. However the trench is formed, one of the raceways, in the preferred embodiment, which is defined by the U-shaped metal channel and the metal cover plate, is completely shielded for varrying electrical power wiring while the remaining raceways on at least one side of the U-shaped channel are unshielded. These channels carry communications wiring such as telephone wires, computer input, output and control wires, process control wires, intercom wires, etc. Access boxes are attached to the top of the trench cover plate over one or more knockouts for providing desired access to wires located in the raceways. Metal channels also are placed perpendicular to and across all of the trenches for defining main power distribution ducts interconnecting the various parallel raceways. A topping or surface layer of concrete or other hardenable material is then poured over the prefabricated floor slab to extend flush with the top of the access boxes and the channels forming the power distribution ducts. Electrical wiring for servicing power and communication needs on the floor area is completed by passing wires through the raceways between the main distribution channels and the access boxes and finally attaching a cover plate over the main distribution channels. Through this arrangement, power wiring for the entire system is shielded from the communications wiring to minimize electrical noise induced into the communications wiring. Furthermore, the cost of placing a metallic cellular subflooring in the building and separate metal ducts for defining both power and communications raceways is eliminated.

In accordance with another embodiment of the present method, parallel sets of a plurality of trenches can be formed in the upper surface of, and spaced interiorly from the edges of, the prefabricated floor slab at the time of pouring. After the concrete has hardened sufficiently, a metal cover plate is placed over the plurality of trenches and the concrete walls, thus forming at least two and preferably three separate wiring raceways. The slab is ultimately installed as a structural member of a building, as previously described, and is covered by a poured floor. Two slabs can be formed with at least one trench and a fraction of another trench in one slab, the fraction extending along an upper edge of the slab, and at least the remaining fraction of the trench extending along an upper edge of the other slab. The slabs are then positioned on building supports with the trench fractions abutting. The joint is grouted, as described above, and a metal cover is placed over the trenches, trench fractions, and concrete walls to form at least two parallel ducts or wiring raceways.

Accordingly, it is an object of the invention to provide an improved method for forming wiring ducts in a concrete building floor.

Another object of the invention is to provide a method for constructing parallel communications and power wiring ducts in a concrete floor with shielding for only the power wiring.

Other objects and advantages of the invention will become apparent from the following detailed description, reference being made to the accompanying drawings.

BRIEF DESCRIPTION OF THE DRAWINGS

FIG. 1 is a fragmentary, sectioned perspective view of an improved concrete floor structure having wiring ducts formed therein in accordance with the present invention;

FIG. 2 is an enlarged fragmentary, sectioned perspective view of an inverted cover plate for dividing a trench formed in a concrete floor slab into three separate raceways;

FIG. 3 is an enlarged fragmentary, cross-sectional view taken along line 3—3 of FIG. 1;

FIG. 4 is a fragmentary, sectioned perspective view of an improved concrete floor structure having wiring ducts formed therein in accordance with a modified embodiment of the invention in which a portion of the floor is constructed from prefabricated concrete slabs;

FIG. 5 is an enlarged fragmentary, cross-sectional view taken along line 5—5 of FIG. 4;

FIG. 6 is an enlarged fragmentary, cross-sectional view taken along line 6—6 of FIG. 4;

Fig. 7 is an enlarged fragmentary, cross sectional view of a modified concrete floor and wiring duct formed in accordance with the present invention;

FIG. 8 is an enlarged fragmentary, cross-sectional view through another modified concrete floor and wiring duct formed in accordance with the present invention;

DESCRIPTION OF THE PREFERRED EMBODIMENTS

Figure 9:
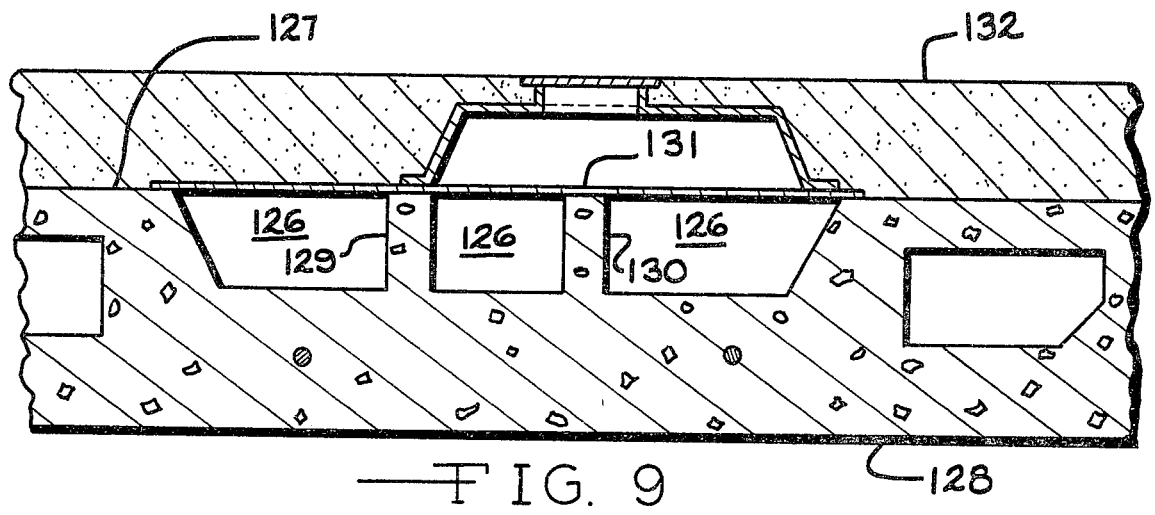
FIG. 9 is an enlarged fragmentary, cross-sectional view through still a further modified concrete floor and wiring duct structure formed in accordance with the present invention.

Turning now to the drawings and particularly to FIG. 1, a building floor structure 10 is shown embodying the structure and constructed by the method of the present invention. The floor structure 10 basically comprises a concrete floor slab 11 and a concrete surface or topping layer 12. Ducts or raceways are formed in the slab 11 and the surface layer 12 for supplying electrical power and communications to predetermined spaced locations in the building in which the floor structure 10 is constructed. Sufficient number of access points to the electrical ducts are provided in the surface layer 12 for supplying power and communications requirements over the floor area regardless of the manner in which the floor area is subsequently subdivided.

When the concrete floor slab 11 is poured, a plurality of parallel trenches 13 are formed in an upper surface 14 of the slab 11. The trenches 13 may be formed by any suitable means, such as by placing wooden forms (not shown) in the upper surface 14 for forming the trenches 13 and, after the concrete in the floor slab 11 has at least partially hardened, removing such forms. After the slab 11 is poured and hardened sufficiently to maintain the shape of the trenches 13, at least some of the trenches 13 are divided into at least two separate wiring ducts or raceways, with three raceways 15-17 shown in the drawings. The raceways 15-17 are formed by placing a cover plate 18 over each trench 13 to extend along the entire length of such trench. As best seen in FIG. 2, a generally U-shaped channel 19 is attached to the cover plate 18. The U-shaped channel 19 is attached to the cover plate 18 by any suitable means, as by spot welds 20 or by rivets, screws, bolts, etc. The channel 19 has sides 21 of a height corresponding to the depth of the trench 13 for dividing the trench 13 into the separate ducts 15-17. It will be noted that the center duct 16 is defined by the U-shaped channels 19 and the cover plate 18 and, therefore, is completely shielded with metal. The ducts 15 and 17 are defined by the concrete walls of the trench 13 on two sides, by the channel sides 21 and by the cover plate 18. Because of the shielding, the duct 16 is particularly suitable for carrying power wires while the ducts 15 and 17 preferably are used for carrying communications wires such as telephone wires, local intercom wires, process control wires, and the like. By shielding the power wires in the duct 16, electrical noise induced into the communications wires is minimized.

Groups of three knockouts 22, 23 and 24 are spaced along each of the cover plates 18 for providing access points through the cover plate 18 into the ducts 15-17, respectively. If, for example, the trenches 13 are located parallel to each other with a five foot center-to-center spacing and each group of knockouts 22-24 is placed at a five foot spacing in the cover plates 18, then the floor structure 10 will have access points into the ducts 15-17 in a grid pattern across the floor structure 10 with a five foot spacing. Such a spacing would normally be sufficient for providing adequate power and communications outlets in a building. The rectangular access boxes 25 may be attached to the cover plate 18 at each group of knockouts 22-24. The access boxes are shown as having a width which permits covering two adjacent ones of the knockouts, such as the knockouts 22 and 23 for providing access to the communications and power ducts 15 and 16 or the knockouts 23 and 24 for providing access to the power and communications ducts 16 and 17. In a preferred embodiment, the access boxes 25 are staggered such that one box 25 on a cover plate 18 provides access to the ducts 15 and 16 through the knockouts 22 and 23 and the next access box 25 on the cover plate 18 provides access to the ducts 16 and 17 through the knockouts 23 and 24. However, it should be appreciated that the width of the access boxes 25 may be such that a box 25 provides access through only one knockout 22, 23 or 24 to one duct 15, 16 or 17, or that a box 25 provides access through all three knockouts 22-24 to the three ducts 15-17.

In addition to the access boxes 25, three channels 26–28 are positioned to extend across and rest upon the cover plates 18. The channels 26–28 are preferably connected to each cover plate 18 to provide electrical ground continuity. The channels 26 and 28 are generally C-shaped while the channel 27 spaced between the channels 26 and 28 is generally U-shaped. In addition, the channels 26–28 have the same height as the height of the access boxes 25. After the channels 26–28 are positioned and attached to the cover plates 18, the concrete surface or topping layer 12 is poured to form a top surface 12' which extends flush with the tops of the access boxes 25 and the channels 26–28.

After the surface layer 12 is poured and has hardened, communications and power wires are run through the raceways or ducts 15–17 and three main distribution raceways 29–31 formed between the channels 26–28 and within the channel 27. As previously indicated, the channels 26–28 extend across all of the cover plates 18 over the trenches 13. Although not mandatory, it may be preferable to position the channels 26–28 perpendicular to the trenches 13. The main distribution raceway or duct 29 between the channels 26 and 27 communicates through an opening 32 in each cover plate 18 to the raceway 17. An opening 33 passes through the bottom of the U-shaped channel 27 and each cover plate 18 for communicating within the duct 30 formed by the channel 27 to each duct 16. Similarly, the duct or raceway 31 formed between the channels 27 and 28 is connected through an opening 34 in each cover plate 18 to the duct or raceway 15. Thus, communications wires are laid in the raceway or duct 29 and passed through the raceway 17 for communicating through the knockouts 24 and access boxes 25 to predetermined locations on the floor structure. Similarly, power wires are passed through the duct 30 formed by the channel 27, through the opening 33 and through the duct 16 for supplying power through the knockouts 23 and access boxes 25 to predetermined locations in the floor structure 10. Communication wires may also be positioned in the duct or raceway 31 and passed through the openings 34 and the ducts or raceways 15. After the wires are positioned in the ducts or raceways 29–31 and 15–17, a cover plate 35 is positioned over the channels 26–28 and fastened to the channels 26 and 28 by means of suitable fasteners 36. The cover plates 35 and 18 and the channels 19 and 26–28 and the access boxes 25 are all grounded for safety. Since the power wires in the ducts 30 and 16 are completely surrounded by the channel 27 and its cover plate 35 and the channel 19 and its cover plate 18, the power wires are all completely shielded. The shielding protects the communications wires from damage in the event of a short circuit in the power wires and also reduces electrical noise which otherwise might be induced into the communications circuits.

Turning now to FIG. 3, a cross section is shown through the ducts 15–17 in one trench 13 and through an access box 25. Although it may not always be required, it will be noted that fasteners 37 are shown attaching the cover plate 18 to the poured concrete slab 11. The fasteners 37 may be of any suitable design, such as explosively driven nails. The primary purpose for the fasteners 37 is to maintain the cover plate 18 centered over the trench 13 while the surface layer 12 is poured. It should be appreciated that if the cover plate 18 is allowed to move while pouring the surface layer 12, the concrete or other hardenable material forming the surface layer 12 may flow into the trench 13. After the cover plate 18 is positioned over the trench 13 to divide the trench into the three separate raceways or ducts 15–17, the access box 25 is attached to the cover plate 18 over either the knockouts 22 and 23 or the knockouts 23 and 24. As shown in FIG. 3, the knockouts 22 and 23 are removed leaving openings 22' and 23', respectively, through the cover plate 18 and into the ducts 15 and 16. The access box 25 is then positioned over these openings 22' and 23'. Wires are positioned in the ducts 15–17 at any suitable time during construction of the floor structure 10. For example, the wires may be run in the ducts 15–17 at the time the cover plate 18 is positioned over the trench 13 and prior to pouring the surface layer 12. Or, wires may be pulled through the ducts 15–17 after the floor structure 10 is completed. A telephone wire 38 is shown exemplifying a typical wire located in the duct 15. The telephone wire 38 passes through the cover plate opening 22' and is terminated at a connector 39. When telephone installation is completed, a serviceman connects a mating connector 40 attached to a line 41 which connects to a telephone (not shown) to the connector 39. The connectors 39 and 40 are positioned within the access box 25 to eliminate any obstacles on the top floor surface 12'. An exemplary power wire 42 is shown in the power duct 16. The power conductor 42 passes through the cover plate opening 23' and is terminated at a standard power receptable 43. An electrical appliance line cord 44 having a standard plug 45 may subsequently be passed through an opening 46 in the access box 25 and plugged into the receptacle 43. The opening 46 is sufficiently large as to permit users of the building to remove the plug 45 or to plug in other appliances.

As shown in FIG. 3, the access box 25 normally provides access to the power duct 16 and to one of the two communication ducts 15 or 17. It may be desirable, for example, to place only telephone wires in one of the communication ducts, duct 15 shown, and to place other communication wires in the duct 17. Furthermore, it also may be desirable to stagger the location of the access boxes 25 such that every other access box on a cover plate 18 provides access to the duct 15 while the remaining alternate access boxes 25 provide access to the duct 17. As represented by the dashed lines 47, if access is subsequently desired into the duct 17 where such access is not provided by an access box 25, an opening above the knockout 24 may be formed through the surface layer 12. Such an opening may be formed by any suitable means, as by drilling through the surface layer 12 or by providing a plug in the surface area 12 which is readily removable at a later date. Of course, where access is desired into both of the communication ducts 15 and 17, the access box 25 may be constructed sufficiently large as to cover each of the three knockouts 22, 23 and 24.

Although FIGS. 1–3 of the drawings specifically show a floor structure 10 having three parallel ducts formed in each trench 13, it will be appreciated that any other desired number of ducts may be formed in a floor trench. For example, if only a single communication duct and a single power duct are desired, the trench 13 may be formed of a width sufficient to form only a single communication duct, duct 15 for example, and a single power duct 16. In such event, the U-shaped channel 19 would be located near one side of the cover plate 18 rather than centered as shown in the drawings. Where additional ducts are desired, it will also be appreciated that more than one U-shaped channel 19 may be attached to the bottom of the trench cover plate 18 for forming the desired number of ducts in the concrete floor slab 11.

Turning now to FIG. 4, a floor structure 50 is shown constructed in accordance with a modified embodiment of the method of the present invention. The floor structure 50 is constructed from a plurality of prefabricated floor slabs, of which two exemplary slabs 51 and 52 are shown in transverse section. The slabs 51 and 52 are precast at a factory in standard widths such as eight feet or twelve feet, and in various lengths for various size structures. To reduce the weight of the slabs 51 and 52, voids 53 are formed to extend longitudinally through the slabs 51 and 52. The strength of the slabs 51 and 52 is maintained through the use of reinforcement rods or bars 54. If desired, the bars 54 may prestress the slabs in a known manner. Wiring ducts 55 are formed in a trench between the abutting slabs 51 and 52 with a fraction 56 of the trench formed in the slab 51 and the remaining fraction 57 of the trench formed in the slab 52. A grouted joint 58 extends between the slabs 51 and 52 and below the trench fractions 56 and 57. A grouted joint 59 is also provided between the slab 51 and a next adjacent slab 60 and a grouted joint 61 is provided between the slab 52 and a next adjacent slab 62. Trenches for use in forming wiring ducts are formed above the grouted joints only when a desired location for wiring ducts or raceways is above such joints. In addition to the trench defined by the trench fractions 56 and 57 in the abutting portions of the slabs 51 and 52, wiring ducts or raceways 63 are formed in a trench 64 located interior from the edges of the slab 51 and wiring ducts 65 are located in a trench 66 located interior from the edges of the slab 52. An exemplary access box 67 is shown for providing access to the wiring ducts 55 which are located between the slabs 51 and 52 and an exemplary access box 68 is shown for providing access to the ducts 63 within the slab 51. The access boxes 67 and 68 are shown embedded within a topping layer 69 formed from concrete or any other suitable hardenable floor material.

Turning now to FIG. 5, details are shown for the wiring ducts or raceways 63 spaced from the edges of and extending the longitudinal length of the floor slab 51. A generally U-shaped channel 70 divides the trench 64 into at least two and preferably three separate wiring ducts or raceways 71, 72 and 73. The U-shaped channel 70 has upper flanges 74 which are welded, bolted or otherwise attached to a cover plate 75 which completely covers the trench 64. Three sides of the duct 71 are defined by the U-shaped channel 70 and the fourth side is defined by the metal cover plate 63. As a consequence, the duct 71 is completely shielded to prevent passage of electromagnetic radiation from wires within the duct 71. The ducts 72 and 73 are located on opposite sides of the U-shaped channel 70 and are defined on two sides by the slab 51, on a third side by the U-shaped channel 70 and on a fourth side by the cover plate 75. Thus, the ducts 72 and 73 are not shielded. Electrical power wiring about which substantial electromagnetic fields may be established is preferably located within the duct 71 while control and communication wiring is located within the ducts 72 and 73. In the event that only two ducts are required, one of the two ducts 72 and 73 may be eliminated either by shortening the size of the trench 64 or by moving the channel 70 to one side of the trench 64. On the other hand, if additional ducts are required, more than one U-shaped channel 70 may be attached to the cover plate 75.

The U-shaped channel 70 is provided with two spaced parallel sides 76 and 77 and a flat bottom 78. The sides 76 and 77 extend below the bottom 78 to define lower fins or projections 79 on each side of the channel 70. The projections extend below the cover plate 75 and below the bottom a distance greater than the depth of the trench 64. The cover plate 75 and attached U-shaped channel 70 are positioned over the trench 64 after the slab 51 is formed and the concrete has solidified only sufficiently to maintain its shape. When the cover plate 75 is positioned over the trench 64, sufficient downward force is applied to force the projections 79 into the concrete at the bottom of the trench 64. By deforming the concrete with the projection 79, the two ducts 72 and 73 are completely isolated, despite minor variations in the depth of the trench 64 along the length of the slab 51. If desired, the cover plate 75 can be anchored to the slab 51 with fasteners similar to the fasteners 37 in FIG. 3 to retain the cover plate 75 in place during shipment and installation of the slab 51. Thus, the slab 51 with the attached cover plate 75 and the U-shaped channel 70 dividing the trench 64 into the three separate ducts 71–73 are prefabricated in a factory.

During construction of a building from the slab 51, the slab 51 is positioned on suitable supports which may be concrete walls or columns or steel beams. One or more of the access covers 68 are positioned over the trench 64 and attached to the cover plate 75 to provide access into the ducts 71–73, as required. In the embodiment shown in FIG. 5, the access box 68 is positioned over the ducts 71 and 73. The access box 68 has an interior opening 80 which communicates through a hole 81 in the cover plate 75 leading into the duct 71 and through a hole 82 in the cover plate 75 leading into the duct 73. The holes 81 and 82 may be formed, for example, by removing knockouts or by any other conventional method. The final step in constructing the floor structure 50 is to pour the topping layer 69 over the slab 51 and flush with a removable cover 83 attached to the top of the access box 68.

Turning now to FIG. 6, a cross sectional view is shown through the wiring ducts 55 and the access box 67 from FIG. 4. The ducts 55 are defined by a U-shaped channel 86 and an attached cover plate 87 which enclose and separate the trench fractions 56 and 57. The ducts 55 include a completely shielded duct 88 formed by the U-shaped channel 86 and the cover plate 87, and unshielded duct 89 formed by the trench fraction 56 in the slab 51, one side of the U-shaped channel 86 and the cover plate 87 and an unshielded duct 90 formed by the trench fraction 57 in the slab 52, the duct 86 and the cover plate 87. The ducts 88-90 are formed during the construction of a building including the floor structure 50. Initially, the slabs 51 and 52 are positioned on a suitable support structure (not shown). The grouted joint 58 is then formed by filling a groove 91 extending between the slabs 51 and 52 and below the trench fractions 56 and 57 with a suitable concretious grouting material. Before such grouting material within the joint 58 has hardened, the cover plate 87 is positioned over the trench fractions 56 and 57 with the U-shaped channel 86 abutting the grouted joint 58. Preferably, a plurality of studs 92 having irregular surfaces or a plurality of other suitable anchors are attached to the bottom of the U-shaped channel 86 at predetermined spacings along its length. The studs or other suitable anchors 92 are pressed into the grouted joint 58 securely anchor in place the cover plate 87 and attached U-shaped channel 86. The grouted joint 58 is also deformed sufficiently by the U-shaped channel 86 to assure that the ducts 89 and 90 are completely isolated from each other. After the U-shaped channel 86 and cover plate 87 are positioned over the trench fractions 56 and 57 and the grouted joint 58, the floor structure 50 is completed in a manner similar to that described for FIGS. 1–3. The access box 67 and other access boxes, as needed, are attached to the cover plate 87 either over the channels 88 and 90 or over the channels 88 and 89 or over all three channels 88–90, as required and at any desired location. The topping layer 69 is then applied to complete the floor. The topping layer 69 is of a thickness sufficient to extend flush with a removable cover 93 for the access box 67. After the floor structure 50 is completed, the space above the floor structure 50 may be divided into rooms, as desired. A typical partition 95 is shown in dashed lines in FIG. 6 located adjacent the access box cover 93. At the same time the building is partitioned into rooms, or if necessary at a subsequent date, suitable electrical power wiring, control wiring, communication wiring and the like is run through the ducts 88–90 to supply the needs of the space above the floor structure 50.

In the embodiment shown in FIG. 5, projections 79 at the bottom of the U-shaped channel 70 were forced into the slab 51 before the concretious material forming the slab 51 had completely hardened. The function of the projections 79 was to assure that the ducts 72 and 73 were completely isolated by the U-shaped channel 70.

Turning now to FIG. 7, a different method is shown for assuring that two ducts 97 and 98 spaced on either side of a U-shaped channel 99 are completely isolated, despite variations in the depth along the length of a trench 100 in which the U-shaped channel 99 is located. The U-shaped channel 99 includes two upper side flanges 101 and 102 which are welded or otherwise attached to a cover plate 103. A lower U-shaped channel member 104 is positioned between the flanges 101 and 102. The U-shaped member 104 includes sides 105 and 106 which are firmly held between the flanges 101 and 102, respectively, by spring tension. When the U-shaped channel 99 and cover plate 103 are positioned within the trench 100, the U-shaped channel 104 is forced upwardly between the flanges 101 and 102 as a bottom 107 of the channel 104 contacts the trench 100. Through this method, the lower U-shaped member 104 contacts the trench 100 to completely isolate the ducts 97 and 98, despite variations in the depth of the trench 100 along its length.

Turning to FIG. 8, still another structure and method are shown for compensating for variations in the depth of a trench 100 when a floor structure is constructed in accordance with the present invention. In this embodiment, a U-shaped channel 111 is not attached to a cover plate 112, as in the previously described embodiments. The trench 110 is formed within a concrete slab 113 having an upper surface 114. The U-shaped channel 111 includes a lower U-shaped member 115 having spaced sides 116 and 117. Bolts 118 pass through vertical slots within a flange 119 and attach such flange 119 to the side 116. Similarly, others of the bolts 118 pass through vertical slots in a flange 120 and attach such flange 120 to the side 117. The bolts 118 are threaded into the sides 116 and 117 and are sufficiently short as not to project appreciably into the duct 122. During construction of ducts 121–123 in the trench 110, the U-shaped channel 111 is positioned in the center of the trench 110. A workman then positions a straightedge on the upper surfaces 114 of the slab 113 to span the trench 110 and to extend over the flanges 119 and 120 of the U-shaped channel 111. The flanges 119 and 120 are then moved into contact with such straightedge so they are flush with the upper surfaces 114. The cover plate 112 is then positioned over the trench 110 and the U-shaped channel 111, access boxes are installed as necessary, and a topping layer 124 is applied to complete the floor structure. Seals 125 are located between the flanges 119 and 120 and the cover plate 112. The seals 125 may consist of resilient members formed from a suitable synthetic resinous material or they may consist of a suitable adhesive which bonds the flanges 119 and 120 to the cover plate 112.

Although several different methods have been described for adjusting or compensating for variations in the depth of a trench when such trench is divided into a plurality of ducts it will be appreciated that other methods may also be used without departing from the invention. For example, the U-shaped channel member may fit within a recess in the bottom of the trench formed in the concrete floor slab. Before positioning the U-shaped channel member within the recess, a suitable hardenable material such as a synthetic resinous material or a concretious material may be positioned within the recess to bond the U-shaped channel member to the floor slab and also to isolate ducts formed on either side of the U-shaped member.

Turning to FIG. 9, another method is shown for producing at least two ducts which are completely isolated when a floor is constructed in accordance with the present invention. A plurality of trenches 126 can be formed in the upper surface 127 of a precast structural slab 128. The center one of the trenches 126 is separated from the adjacent ones by concrete walls 129 and 130. After the concrete has hardened sufficiently, a cover plate 131 is placed over the trenches 126 and the concrete walls 129 and 130, thus converting the three trenches into three wiring ducts or raceways. The cover plate 131 extends along the entire lengths of the trenches. The slab 128, either before or after installation of the cover plate 131, is installed as one of the required structural members of a building floor, as previously described, and the several members are covered by a poured floor 132.

Figure 10:
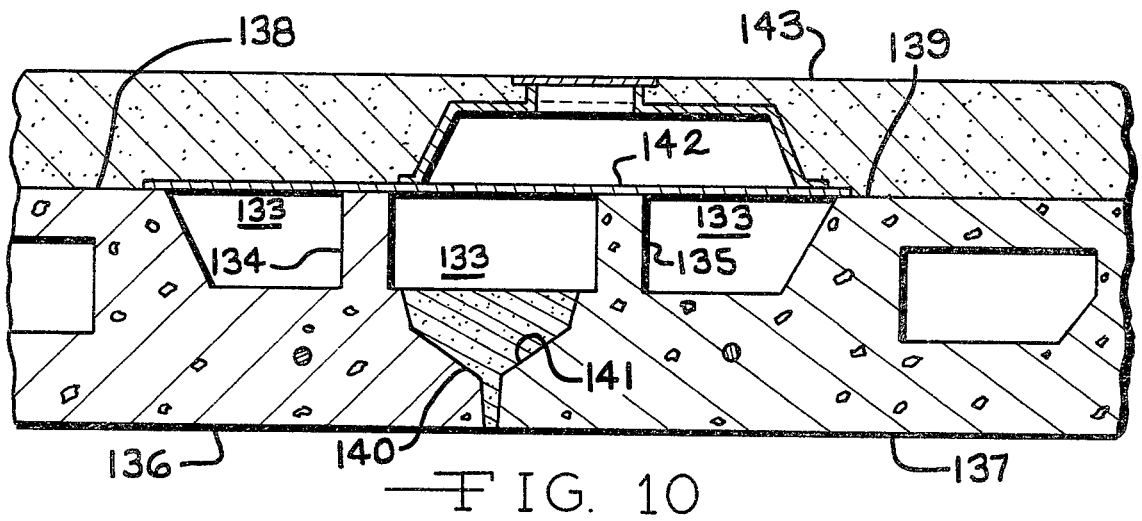
FIG. 10 is an enlarged fragmentary, cross-sectional view through still another modified concrete floor and wiring duct structure where one of the ducts if formed over a joint between two precast structural slabs in accordance with the present invention.

Referring to FIG. 10, three trenches 133 separated by concrete walls 134 and 135 are shown, one of the trenches 133 and the wall 134 being a part of a precast structural slab 136 and a second of the trenches 133 and the wall 135 being a part of a second structural slab 137. A fraction of the center one of the trenches 133 is in the upper surface 138 of the slab 136, while the remaining fraction thereof is in the upper surface 139 of the slab 137. The center one of the trenches 133 is formed during the construction of a building when slabs 136 and 137 are positioned on a suitable support structure (not shown). A grouted joint 140 is then formed by filling a groove 141 extending between the slabs 136 and 137 and below the center one of the trenches 133 with a suitable concretious grouting material. A cover plate 142 is placed over the trenches 133 and concrete walls 134 and 135, thus converting the three trenches into three wiring ducts or raceways. The slabs are then covered by a poured floor 143 as previously described.

Figure 11:
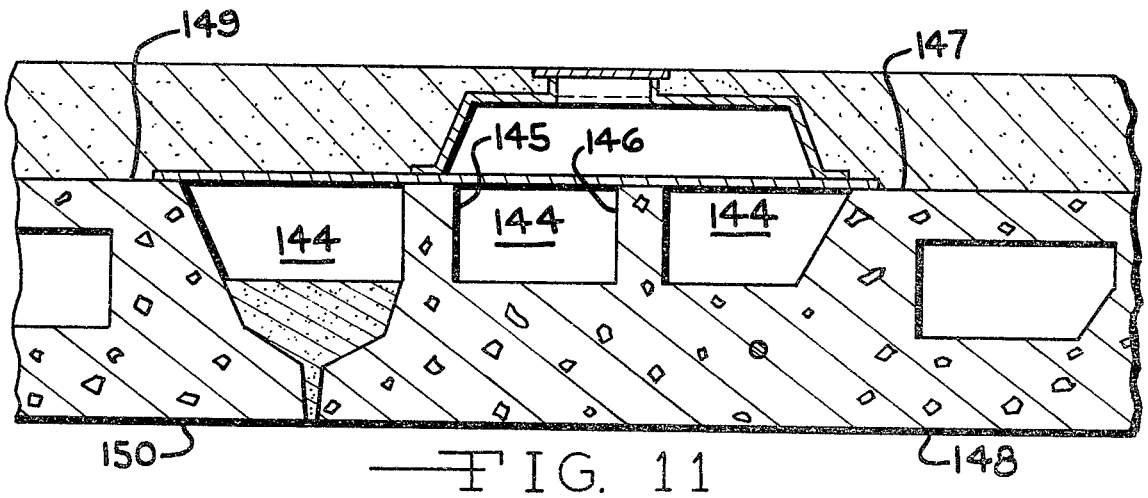
FIG. 11 is an enlarged fragmentary, cross-sectional view through still a further modified concrete floor and wiring duct structure where one of the ducts is formed over a joint between two precast structural slabs in accordance with the present invention.

Referring to FIG. 11, the center and right ones of trenches 144, two concrete walls 145 and 146, and a fraction of a left trench 144 are formed in the upper surface 147 of a slab 148. The remaining fraction of the left one of the trenches 144 is formed in the upper surface 149 of a slab 150. The left one of the trenches 144 is formed in the same manner as the center one of the trenches 133 in FIG. 10.

The trenches in precast slabs can be formed in any appropriate manner, for example, by placing suitable forms in a casting bed, preferably after concrete has been cast in the bed to a depth which corresponds with the bottoms of the trenches, and then casting additional concrete around the forms to produce the completed slab with the desired number of trenches. Casting beds used for producing precast structural concrete members usually consists of an elongate form having the length and width of the desired precast slab, e.g., a length of, perhaps, 40 feet and a width of 6 feet. Concrete is cast into the form from a mixing hopper which rides on rails, one mounted on each side of the form and is moved lengthwise of the form as casting progresses. The trench can also be formed in a precast slab by a contoured roller carried by the mixing hopper, and extending across the top of the form in which the slab is cast. The roller can have at least one radially enlarged portion to form at least one trench in the slab, and the remainder thereof can be flush with the upper surface of the slab, as ultimately formed. It is often advantageous to use a plurality of rollers progressively differing in contour so that the formation of each trench is commenced by the first roller, continued by the second and completed by the last, which shapes the entire upper surface of the cast slab to the desired contour.

It will be apparent that various changes and modifications can be made from the specific details of the invention as described herein and shown in the attached drawings without departing from the spirit and scope thereof as defined in the appended claims.

What I claim is:

1. A method for forming a plurality of electrical wiring ducts in a prefabricated building floor slab comprising the steps of: forming said floor slab from a hardenable material; forming at least one trench in an upper surface of said floor slab before such material hardens; after such material at least partially hardens, placing a metal cover plate having a U-shaped channel attached thereto over said trench with said channel dividing said trench into at least two parallel ducts with one duct defined by said cover plate and said U-shaped channel and at least one other duct defined by said cover plate, said U-shaped channel and said trench, and, after such material hardens into a prefabricated building floor slab, positioning said slab on suitable supports of a building.

2. A method for forming a plurality of electrical wiring ducts in a building floor, as set forth in claim 1, wherein said trench is divided into three ducts with a duct on either side of said one duct defined by said cover plate, said U-shaped channel and said trench, and wherein said step of placing said metal cover plate and attached U-shaped channel over said trench includes the step of adjusting said U-shaped channel to contact said trench along the length of said trench whereby ducts on either side of said U-shaped channel are isolated.

3. A method for forming a plurality of electrical wiring ducts as claimed in claim 1 wherein the metal cover plate is placed over the trench before the slab is placed on the building supports.

4. A method for forming a plurality of electrical wiring ducts in a building floor slab, as set forth in claim 1, wherein said metal cover is placed over said trench when such material has hardened only sufficiently to maintain the shape of said trench, and wherein said U-shaped channel is forced against and deforms a bottom of said trench when said cover is placed over said trench whereby ducts on either side of said U-shaped channel are isolated.

5. A method for forming a plurality of electrical wiring ducts in a building floor slab, as set forth in claim 3, and further including the steps of selectively attaching a plurality of access boxes to an upper surface of said cover plate for providing access into said ducts, and pouring a surface layer of a hardenable material over said slab and said cover plate.

6. A method for forming a plurality of electrical wiring ducts in a building floor slab comprising the steps of: forming said floor slab from a hardenable material with at least one trench formed in an upper surface of said slab; after such material at least partially hardens, placing a U-shaped channel in said trench to divide said trench into three ducts; placing a metal cover over said trench and said U-shaped channel whereby a first duct is defined by said cover plate and said U-shaped channel and two other ducts are defined on either side of said first duct by said cover plate, said U-shaped channel and said trench; and adjusting the height of said U-shaped channel in said trench to completely isolate said two other ducts from each other.

7. A method for forming a plurality of electrical wiring ducts in a building floor slab, as set forth in claim 6, wherein the height of said U-shaped channel is adjusted prior to placing said cover over said trench and said U-shaped channel.

8. A method for forming a plurality of electrical wiring ducts in a building floor slab, as set forth in claim 6, and further including the steps of selectively attaching a plurality of access boxes to an upper surface of said cover plate for providing access into said ducts, and pouring a surface layer of a hardenable material over said slab and said cover plate.

9. A method for forming a building floor structure with a plurality of wiring ducts therein comprising the steps of: forming at least two floor slabs from a hardenable material with a fraction of a trench extending along an upper edge of one of the slabs and the remaining fraction of the trench extending along an upper edge of the other slab; positioning said slabs with said trench fractions abutting; grouting a joint extending between said floor slabs below said trench fractions; and positioning a U-shaped channel to divide the trench formed by said trench fractions into at least two separate ducts and positioning a cover plate over the trench formed by said trench fractions and said U-shaped channel.

10. A method forming a building floor structure, as set forth in claim 9, and further including the steps of selectively attaching a plurality of access boxes to an upper surface of said cover plate for providing access into said ducts; and pouring a surface layer of a hardenable material over said slabs and said cover plate.

11. A method for forming a plurality of electrical wiring ducts in a prefabricated building floor slab comprising the steps of: forming said floor slab from a hardenable material; forming at least one set of a plurality of trenches in an upper surface of said floor slab before such material hardens, each trench being separated from the adjacent one by a concrete wall; after such material at least partially hardens, placing a metal cover plate over said trenches and concrete walls to form at least two parallel ducts each being defined by said cover plate and said trench, and, after such material hardens into a prefabricated building floor slab; positioning said slab on suitable supports of a building, with the proviso that the metal cover can be placed over the trench either before or after the slab is placed on the building supports.

12. A method for forming a plurality of electrical wiring ducts in a building floor slab, as set forth in claim 11, and further including the steps of selectively attaching a plurality of access boxes to an upper surface of said cover plate for providing access into said ducts, and pouring a surface layer of a hardenable material over said slab and said cover plate.

13. A method for forming a building floor structure with a plurality of wiring ducts therein comprising the steps of: forming from a hardenable material at least two floor slabs each of which has at least one trench and a fraction of another trench, each trench being separated from the adjacent one by a concrete wall, the fraction extending along an upper edge of one of the slabs and at least the remaining fraction of the one trench extending along the upper edge of the other slab; positioning said slabs with said trench fractions abutting; grouting a joint extending between said floor slabs below said trench fractions; and positioning a cover plate over said trenches, trench fractions, and concrete walls to form at least two parallel ducts each being defined by said cover plate and said trench.

14. A method for forming a building floor structure, as set forth in claim 13, and further including the steps of selectively attaching a plurality of access boxes to an upper surface of said cover plate for providing access into said ducts; and pouring a surface layer of a hardenable material over said slabs and said cover plate.

* * * * *